(No Model.)

F. P. McHARDY.
VELOCIPEDE.

No. 490,587. Patented Jan. 24, 1893.

on line x–x.

on line y–y.

Witnesses
Raymond F. Barnes

Inventor
F. P. McHardy
By his Attorney
P. T. Dodge

UNITED STATES PATENT OFFICE.

FRANCIS P. McHARDY, OF CHICAGO, ILLINOIS.

VELOCIPEDE.

SPECIFICATION forming part of Letters Patent No. 490,587, dated January 24, 1893.

Application filed March 11, 1892. Serial No. 424,561. (No model.)

*To all whom it may concern:*

Be it known that I, FRANCIS P. MCHARDY, of Chicago, county of Cook, and State of Illinois, have invented a new and useful Improvement in Velocipedes, of which the following is a specification.

My invention relates to bicycles having a rear driving and a front steering wheel, and an intermediate connecting-frame sustaining a seat, and also a pedal or driving-shaft connected by suitable gearing to the rear wheel.

The objects of this invention are to construct a machine of this character which will be light and durable and in which the violent shocks and strains to which bicycles are subjected in practice will be taken up and not be transmitted to the rider.

With these ends in view my invention consists primarily in so constructing the intermediate frame and the parts sustained thereby that the rider's seat and the driving-shaft and its connections will be capable of a limited yielding movement in a vertical direction, and will be maintained substantially in fixed relations.

The invention also consists in the details of construction and combinations of parts hereinafter described and claimed.

Figure 1:
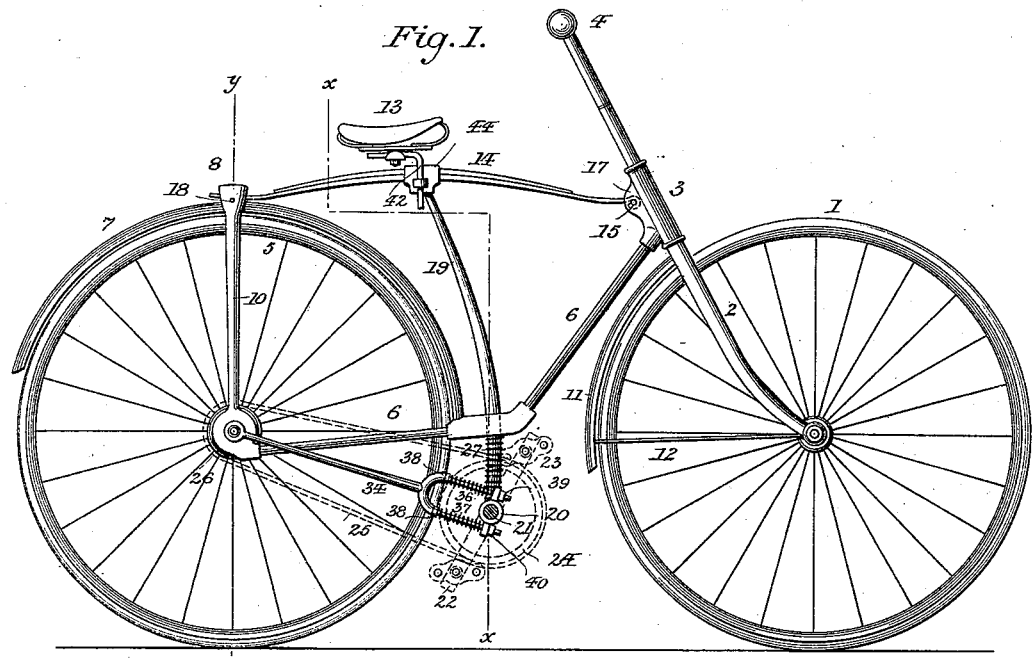
Figure 2:
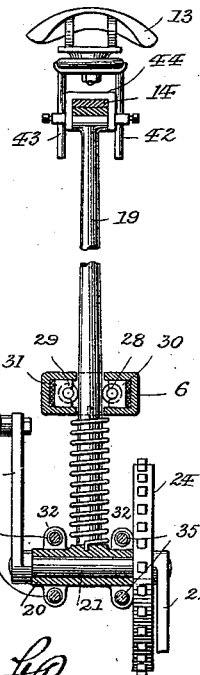
Figure 3:
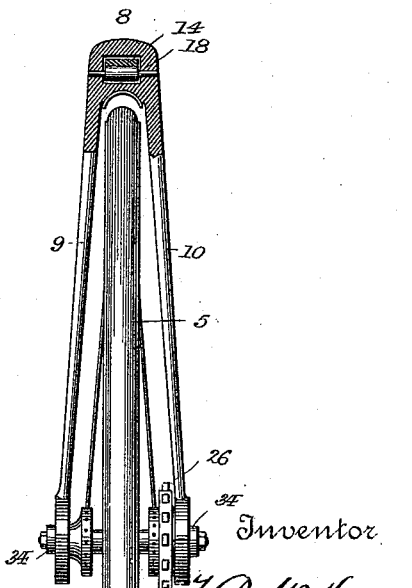

In the accompanying drawings,—Figure 1 is a side elevation of a bicycle embodying my invention, the sprocket-wheel, crank and pedals being shown in dotted lines. Fig. 2 is an elevation partly in section on the line $x$—$x$. Fig. 3 is a vertical cross-section on the line $y$—$y$.

Referring to the drawings,—1 represents a front steering wheel mounted in the lower end of a steering-fork 2, which is swiveled in a steering-head 3. This steering-fork is continued above the head where it is provided with a handle 4, as usual.

5 represents a rear driving wheel journaled between the rear forked ends of a frame-bar 6, which extends therefrom in a forward and upward direction to the steering-head 3, to which it is rigidly attached.

7 represents a mud-shield which extends partly around the rear wheel above the same, and is connected at its forward end to the frame-bar 6, being secured near its rear end above the wheel within a clip 8, which latter is secured rigidly to the upper ends of two bars 9 and 10. These bars extend vertically on both sides of the wheel to its center where they are connected to the rear forked end of the frame-bar 6. The front wheel is provided with a mud-shield 11, connected to the steering-fork and the rear ends of brace-rods 12, having their front ends attached to the lower ends of the steering-fork.

The foregoing parts comprise a rigid connecting-frame between the front and rear wheels, and except in so far as hereinafter pointed out, may be of any suitable construction which will adapt it to sustain the driving connections and the seat.

13 represents a seat sustained by a leaf spring 14, the front end of which is fixed to a transverse bolt 15, extending between ears 17, projecting rearwardly from the steering-head while its rear end is seated upon a roller 18 journaled in the clip 8. As a result of this arrangement the spring may readily yield under the weight of the rider, and will respond to the sudden jolts and shocks to which the machine may be subjected.

To the under side of the spring 14 beneath the seat is attached the upper end of a vertical standard 19, which extends loosely between the forked ends of the frame-bar 6, in front of the rear wheel, and is connected rigidly at its lower end to a transverse journal-box 20. Within this journal-box a driving-shaft 21 is mounted and is provided at its ends with crank and pedals 22 and 23. The driving-shaft also carries a sprocket-wheel 24, connected by a chain 25 to a sprocket-wheel 26 on the axis of the rear driving-shaft in the usual manner. From this it will be seen that the driving shaft and its adjacent parts are connected by the standard 19 to the spring sustaining the seat, so that the driving connections and the seat are capable of a vertical yielding movement together independent of the rigid connecting-frame. As a result the distance between the pedals and the seat will not vary as the two rise and fall. In order that the parts may be prevented from moving in this manner to an objectionable extent a spiral spring 27, is located on the standard with its coils surrounding the same between the frame-bar and the transverse journal-box, and has its upper and lower ends connected respectively thereto. In this way the spring acts as a cushion both to the upward and downward thrusts of the standard and effectually limits to the proper extent its vertical motion.

To avoid the rattling of the standard in its movement between the forks of the frame-bar and to reduce to a minimum the friction between these parts, rolls 28 and 29 are journaled in yielding bearings 30 and 31 on the inner sides of the forks in such position that the standard will move between them and in contact therewith. These rollers, owing to their yielding bearings, will hold the standard snugly between them and effectually prevent any rattling of the parts.

In order that the lower end of the standard and the driving connections carried thereby may move uniformly and be truly guided and prevented from moving or twisting laterally the journal-box is provided on its top and bottom on both sides of the standard with perforated lugs 32 and 33 constructed to receive the forward forked ends of connecting-rods 34 and 35. These rods are extended rearwardly on both sides of the rear wheel, and are mounted at their ends on the axis of the wheel. Spiral springs 36 and 37 are seated on the forward ends of the rods between nuts 38 and the projecting lugs. The springs are of such tension that they will yield to violent shocks but will hold the parts steadily and prevent shifting or twisting of the same. The forked ends of these rods, beyond the perforated lugs, are provided with nuts 39 and 40, by means of which and the nuts 38 the tension of both the springs and the driving-chain may be regulated.

The seat 13 is provided with the downwardly-extending arms 42 and 43, which are adjustably secured to the opposite sides of a clip or saddle 44, seated upon and secured to the spring 14. Under this arrangement the seat may be raised or lowered in the customary manner to adapt the machine to different riders.

Having thus described my invention, what I claim is,—

1. In a bicycle, the combination of the steering-fork, the front wheel journaled therein, the rearwardly extending forked frame-bar, the rear wheel mounted between the forked ends of said bar, the spring 14 extending between the two wheels, the transverse journal-box and its driving-shaft and pedals, and the standard 19, having its upper end connected to the spring 14, and its lower end extended between the forks of the frame-bar and connected to the journal-box, whereby the journal-box and driving-shaft are permitted a slight vertical movement independently of the frame.

2. In a bicycle, the combination with the forked frame bar of the standard extending loosely therethrough, the seat sustained at the upper end of the standard, the driving-shaft sustained at its lower end, and the coiled spring applied to the standard and having its ends connected with the frame and with the journal-box in such manner as to limit both the upward and downward movements of the standard, journal-box, and shaft.

3. In a bicycle, the combination of the front and rear wheels, the forked frame-bar connecting the two, the spring extending between the wheels, the seat sustained thereby, the journal-box and its driving-shaft, the standard extending between the forks of the frame-bar having its upper end connected to the spring 14, and its lower end connected to the transverse journal-box, and the coiled spring encircling the standard between the forked frame and the journal-box and having its ends connected respectively thereto.

4. In a bicycle, the combination of the forked frame-bar, the roller journaled on the inner side of the fork, the standard extending between the forks in contact with the roller, the seat at the upper end of the standard, the journal box at its lower end and the driving-shaft mounted in said journal-box.

5. In a bicycle, the combination of the steering-fork, the front wheel journaled therein, the rear wheel, the connecting frame within which the said wheel is journaled, the clip 6, the vertical bar 10, sustaining the same, the roller journaled in said clip and the springs 14, having its front end sustained by the steering-fork and its rear end seated upon the roller.

6. In a bicycle, the combination with the front and rear wheels and the connecting-frame of the journal-box with its driving-shaft, mounted to move vertically to a limited extent, the perforated lugs on the journal-box, the connecting rods having their forward ends forked and extended through the said lugs, and their rear ends mounted on the axis of the rear wheel, the springs seated on the forked ends of the rods, and the adjusting nuts to vary the tension of the springs.

7. In a bicycle, the combination of the steering-fork, the front-wheel mounted therein, the rearwardly-extending forked frame-bar 6, the rear wheel mounted within said bar, the vertical rods 10, the clip sustained at their upper ends, the spring 14, having its front end connected to the steering fork and its rear end sustained loosely by the clip, the seat sustained by the spring 14, the journal-box, the driving-shaft mounted therein, the sprocket wheels and chains, the standard 19, extending between the forked ends of the frame-bar in front of the rear wheel, with its upper end connected to the spring 14, and its lower end to the journal-box, the spiral spring applied to the standard, and the connecting rods having their rear ends mounted on the axis of the rear wheel and their front ends yieldingly connected to the journal-box.

In testimony whereof I hereunto set my hand, this 1st day of February, 1892, in the presence of two attesting witnesses.

FRANCIS P. McHARDY.

Witnesses:
OTTO F. JENS,
C. R. WHELAN.